US009592621B2

(12) United States Patent
DeMarco et al.

(10) Patent No.: US 9,592,621 B2
(45) Date of Patent: Mar. 14, 2017

(54) EQUIPMENT FOR HIGH SPEED TRANSVERSAL PERFORATIONS OF VARIABLE LENGTHS ON CONTINUOUS FORMS IN MOVEMENT

(75) Inventors: Giuliano DeMarco, Ivrea (IT); Armando Aprato, Ivrea (IT); Francesco Terrusi, Ivrea (IT); Francesco Modica, Ivrea (IT); Gianrico Scarton, Ivrea (IT)

(73) Assignee: Tecnau S.r.l., Ivrea (TO) (IT)

( * ) Notice: Subject to any disclaimer, the term of this patent is extended or adjusted under 35 U.S.C. 154(b) by 198 days.

(21) Appl. No.: 14/235,525

(22) PCT Filed: May 18, 2012

(86) PCT No.: PCT/EP2012/059254
§ 371 (c)(1), (2), (4) Date: Jan. 28, 2014

(87) PCT Pub. No.: WO2012/156506
PCT Pub. Date: Nov. 22, 2012

(65) Prior Publication Data

US 2014/0174270 A1 Jun. 26, 2014

(30) Foreign Application Priority Data

May 19, 2011 (IT) .............................. TO2011A0445

(51) Int. Cl.
*B23D 25/12* (2006.01)
*B23D 19/02* (2006.01)
(Continued)

(52) U.S. Cl.
CPC ................ *B26F 1/20* (2013.01); *B26D 5/005* (2013.01); *B26D 7/20* (2013.01); *B26D 7/265* (2013.01); *Y10T 83/4838* (2015.04)

(58) Field of Classification Search
CPC .......... B26D 5/005; B26D 7/265; B26D 7/20; Y10T 83/4838
(Continued)

(56) References Cited

U.S. PATENT DOCUMENTS 3,000,250 A * 9/1961 Altmann ............. B26D 1/0006 83/341
3,078,796 A * 2/1963 Kamata .............. B41F 27/1212 101/378
(Continued)

FOREIGN PATENT DOCUMENTS

DE 4011365 C1 * 4/1991 ............ D21G 1/022

*Primary Examiner* — Ghassem Alie
*Assistant Examiner* — Bharat C Patel
(74) *Attorney, Agent, or Firm* — Banner & Witcoff, Ltd.

(57) ABSTRACT

Perforating equipment (111) for high speed transversal perforations of variable lengths on a continuous form (32) in movement is disclosed. The perforations are carried out by means of a perforating blade (39*a*) against a projecting profile (41*a*) of a blade contrast (39*a*) and blade and contrast servomechanisms (43, 128) for rotating a support for the blade and the blade contrast. The projecting profile (41*a*) has sectors with axial extensions different in dependence on their angular positions. The contrast servomechanism (128) is settable for selecting an angular phase of the blade contrast (39*a*), such to positioning, for the contrast with the blade, a sector of the projecting profile (41*a*) having axial extension equal to the requested length of the perforation (P). The blade contrast can be constituted by a hollow cylinder (113) rotatable around a support shaft (114) as a radial air bearing of pneumostatic type.

23 Claims, 10 Drawing Sheets

(51) Int. Cl.

| | |
|---|---|
| ***B26D 1/20*** | (2006.01) |
| ***B26F 1/20*** | (2006.01) |
| ***B26D 5/00*** | (2006.01) |
| ***B26D 7/20*** | (2006.01) |
| ***B26D 7/26*** | (2006.01) |

(58) Field of Classification Search

USPC ...... 83/346, 351, 492, 508, 887, 508.1, 678, 83/659, 614, 591, 660, 872, 304, 672, 83/692, 862, 343, 344, 347

See application file for complete search history.

(56) References Cited

U.S. PATENT DOCUMENTS

| | | | | | |
|---|---|---|---|---|---|
| 3,203,292 | A * | 8/1965 | Schmermund | B26D 1/245 | 83/341 |
| 3,230,809 | A * | 1/1966 | Luck | B26D 1/626 | 83/341 |
| 4,020,724 | A * | 5/1977 | Quinlan | B26D 7/2628 | 493/60 |
| 4,147,312 | A * | 4/1979 | Secor | B65H 75/243 | 242/576.1 |
| 4,186,633 | A * | 2/1980 | Baumann | A47K 10/36 | 83/155 |
| 4,240,312 | A * | 12/1980 | Ward, Sr. | B26D 1/405 | 83/311 |
| 4,295,843 | A * | 10/1981 | Otomaru | B26D 7/08 | 493/354 |
| 4,901,627 | A * | 2/1990 | Schulze | F15B 9/12 | 91/374 |
| 4,939,897 | A * | 7/1990 | Schmolke | D01H 4/32 | 57/301 |
| 5,059,286 | A * | 10/1991 | Beisswanger | B65H 23/24 | 162/368 |
| 5,170,687 | A * | 12/1992 | Ratjen | D01G 1/04 | 83/343 |
| 5,257,965 | A * | 11/1993 | Fuchs | D21F 3/08 | 492/40 |
| 5,284,304 | A * | 2/1994 | Biagiotti | B26D 7/08 | 242/526.1 |
| 5,388,490 | A * | 2/1995 | Buck | B26D 7/2628 | 83/344 |
| 5,655,444 | A * | 8/1997 | Kayser | D21G 1/00 | 100/155 R |
| 5,813,959 | A * | 9/1998 | Hader | B21B 27/055 | 492/16 |
| 5,967,957 | A * | 10/1999 | Kusters | F16C 32/0666 | 492/16 |
| 6,045,492 | A * | 4/2000 | Brendel | F16C 13/028 | 492/20 |
| 6,135,002 | A * | 10/2000 | Neal | B26D 7/20 | 492/40 |
| 6,494,398 | B1 * | 12/2002 | De Matteis | B65H 19/26 | 242/521 |
| 6,659,926 | B2 * | 12/2003 | Haag | D21G 1/022 | 492/16 |
| 6,889,587 | B2 * | 5/2005 | Neal | B26D 7/20 | 83/347 |
| 7,146,893 | B2 * | 12/2006 | Aichele | B26D 7/2614 | 464/180 |
| 7,430,948 | B2 * | 10/2008 | De Marco | B65H 20/22 | 83/236 |
| 7,484,445 | B2 * | 2/2009 | De Marco | B26D 5/34 | 83/342 |
| 7,784,386 | B2 * | 8/2010 | Chan | B26F 1/384 | 83/343 |
| 8,336,435 | B2 * | 12/2012 | Grenier | B26D 7/20 | 83/346 |
| 8,353,236 | B2 * | 1/2013 | De Marco | B26D 1/405 | 83/492 |
| 8,783,144 | B2 * | 7/2014 | Compagnone | B26D 7/1836 | 83/100 |
| 2009/0071608 | A1 * | 3/2009 | Thomas | B65C 9/1819 | 156/516 |
| 2011/0192263 | A1 * | 8/2011 | De Marco | B26D 1/405 | 83/343 |

* cited by examiner

EQUIPMENT FOR HIGH SPEED TRANSVERSAL PERFORATIONS OF VARIABLE LENGTHS ON CONTINUOUS FORMS IN MOVEMENT

FIELD OF THE INVENTION

The present invention relates to an equipment for high speed transversal perforations of variable lengths on continuous forms in movement.

More specifically, the invention relates to an equipment for executing high speed transversal perforations of variable lengths on continuous forms in movement comprising a blade support with at least a perforating blade, a blade contrast having at least one projecting profile of contrast for the perforating blade, and servomechanisms for the bade support and the blade contrast according to the introductory part of claim 1.

BACKGROUND OF THE INVENTION

Equipments for transversal perforations are used in systems for the automatic processing of documents for executing perforations that facilitate the tearing of predefined sections. The documents are derived from continuous paper forms, downstream of printers and/or high speed unwinding devices. The perforations may be arranged in different sections of the document. Moreover it is often requested to modify the lengths of these perforations.

A perforating equipment of the above mentioned kind is described in the Italian patent application TO 2010A000084 filed on 8 Feb. 2010 in the name of the applicant Tecnau S.r.l. This equipment comprises a blade support with two blades, which is actuated for the rotation by a blade servomechanism in synchronism with the form for the perforation and a blade contrast with active sections and remaining inactive sections, which is rotated by a contrast servomechanism parallel to the blade support. In condition of perforation, each active section, in synchronism with the form, provide a function of contrast for the blade. In condition of non-perforation, each inactive section is spaced away from a surface of tangency with the blade, whereby avoiding the perforation on the passage of a blade maintained in movement.

Perforation devices made in accordance with that patent application execute transversal perforations at high velocity, with limited costs and high flexibility. The distances between contiguous perforations, as defined by the users, can be close each the other or spaced away. The lengths and the positions of the perforations on the documents are determined by the lengths and the axial positions of the perforating blades on the blade support. Therefore, the choice is limited to the lengths and positions of the blades currently mounted on the respective supports.

Perforations of lengths different from the lengths allowed by the blades on board of the support can only be obtained by manually replacing the blades with other blades suitable for the lengths of the desired perforations. This override is quite simple and quick. However, it involves a temporary arrest of the equipment and then the entire system for the processing of the documents.

SUMMARY OF THE INVENTION

An object of the invention is to carry out an equipment for high speed transversal perforations of variable lengths on continuous forms in movement, in which the variation of length of the perforations is obtainable by control, without replacing of mechanical components.

According to such object, the perforating equipment is obtained by providing that the projecting profile has sectors with different axial extensions in dependence on their angular positions, the contrast servomechanism is settable for selecting an angular phase of the blade contrast, such to positioning, for the contrast with a blade, a sector of the projecting profile having axial extension equal to the requested length of the perforation; the blade contrast comprises a hollow cylinder of low rotational inertia, which defines the projecting profile and the hollow cylinder is rotatable around a support shaft without any mechanical contact, as a radial air bearing of pneumostatic type, according to the characterizing part of claim 1.

In accordance with another characteristic, the perforating equipment of the invention is obtained by providing that the projecting profile, of contrast for the blade, has sectors with different axial extensions increasing or decreasing in dependence on their angular positions, and in which the contrast servomechanism is settable for selecting an angular phase of the blade contrast, such to positioning, for the contrast with a blade, a sector of the projecting profile having axial extension equal to the requested length of the perforation, according to the characterizing part of claim 11.

The characteristics of the invention will become clear from the following description given purely by way of non-limiting example, with reference to the appended drawings in which:

DETAILED DESCRIPTION OF THE PREFERRED EMBODIMENTS

Figures 1, 1A:
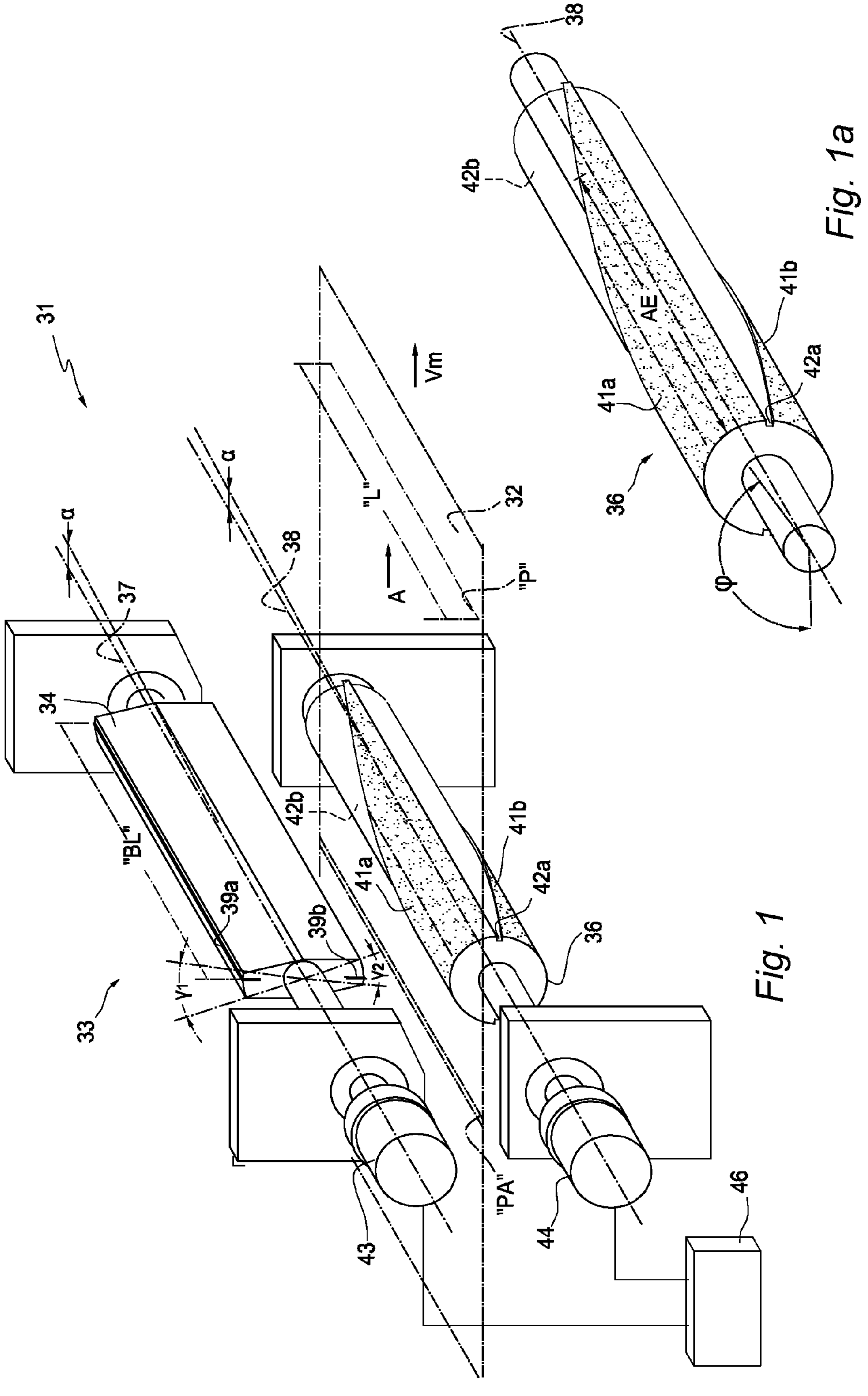
FIG. 1 represents a partial scheme of an equipment for transversal perforations of variable lengths on continuous forms in movement, in accordance with a first embodiment of the invention.
FIG. 1*a* is the schematic view of a component of the equipment of FIG. 1.

FIG. 1 represents a perforating equipment 31, according to the invention, for transversal perforations of variable lengths on continuous forms 32 (FIG. 2) in movement. The equipment 31 (FIG. 1) is also provided of one or more longitudinal perforating devices, not represented, for executing on the forms 32 longitudinal perforations in transversal positions and for longitudinal extensions settable by the user. These longitudinal perforating devices are of known type, and are herein not described as external to the present invention.

For what it concerns the transversal perforations, the equipment 31 includes a perforating group 33 including a blade support 34 and a blade contrast 36 provided for rotation about respective parallel axes 37 and 38 transversally to a direction of movement "A" of the form 32. The blade support 34 includes a bar with a section of elongated approximately rhomboidal shape, for a low rotational inertia, having an axis coincident with the axis 37 and including two active sectors of limited angular extension (γ1, γ2) and on which are mounted two respective perforating blades 39*a* and 39*b*.

The blade contrast 36 (See also FIG. 1*a*) is constituted by a cylinder of high hardness material with axis coincident with the axis 38, including two projecting profiles 41*a* and 41*b*, of contrast for the blades 39*a* and 39*b*, and two depressed profiles 42*a* and 42*b*. The projecting profiles 41*a* and 41*b* define a cylindrical contrast surface, tangent to a movement surface of the continuous form 32 and axis coincident with the axis 37, while the depressed profiles 42*a* and 42*b* are limited by surfaces depressed with respect to the movement surface of the form 32.

The equipment 31 also comprises a blade servomechanism 43 and a contrast servomechanism 44 for the support blade 34 and the blade contrast 36 and an electronic control unit 46. The electronic unit 46 operates on the blade servomechanism 43 so as to position a selected perforating blade 39*a*, 39*b* in synchronism with a velocity Vm of the form 32 for executing transversal perforations in pre-defined areas of perforation "PA" of the form. The electronic unit 46 also operates on the contrast servomechanism 44 so as to precisely position a selected sector of the projecting profiles 41*a* and 41*b* in correspondence of the area "PA" provided for the perforation.

In detail, the electronic control unit 46 operates on the blade servomechanism 43 to bring the support 34 from an inoperative condition of the blades to a condition of perforation in which a selected blade perforates the form for interference with the selected sector of one of the projecting profiles. To optimize the perforation speed, the control unit 46 can also drive the blade servomechanism 43 so as to maintain the blade in movement, after the perforation, at a given basic velocity. To this end, the contrast servomechanism 44 positions the blade contrast 36 so as to have a sector of the depressed profiles 42*a* or 42*b* in front of the form 32 in movement, allowing the blade 39*a* or 39*b* to execute an idle run between two adjacent perforations.

The perforating equipment 31 is structurally similar to the perforating equipment described in the Italian patent application TO 2010A000084, filed on 8 Feb. 2010 in the name of the applicant Tecnau S.r.l, and the content of which is herein included for reference.

According to the invention, the blades 39*a* and 39*b* have a length "B1" congruent with perforations of maximum length "L" of the form 32. The sectors constituting the projecting profiles 41*a* and 41*b* have different axial extensions "AE" increasing or decreasing in dependence of their angular position "ϕ" with respect to a reference position "0", while the contrast servomechanism 44 is settable for modifying the phases of the blade contrast 36 so as to selectively position, for the contrast with the perforating blade 39*a*, 39*b* on the areas "PA", the sectors of the projecting profiles having axial extension equal to the desired lengths of the perforations.

The positions and lengths of the perforations along the continuous form 32 are selectable according to the known technique, for example on the basis of coded information on the same form and/or specific controls of the user.

First Embodiment of the Invention

In a first embodiment of the invention of FIG. 1 and FIG. 1*a*, the axial extensions "AE" of the sector constituting the projecting profiles 41*a* and 41*b* vary in a continuous manner in dependence of their angular position according to a given reference direction (clockwise in the figures), up to a maximum represented by a maximum length of perforation "L" of the continuous form 32.

Figure 2:
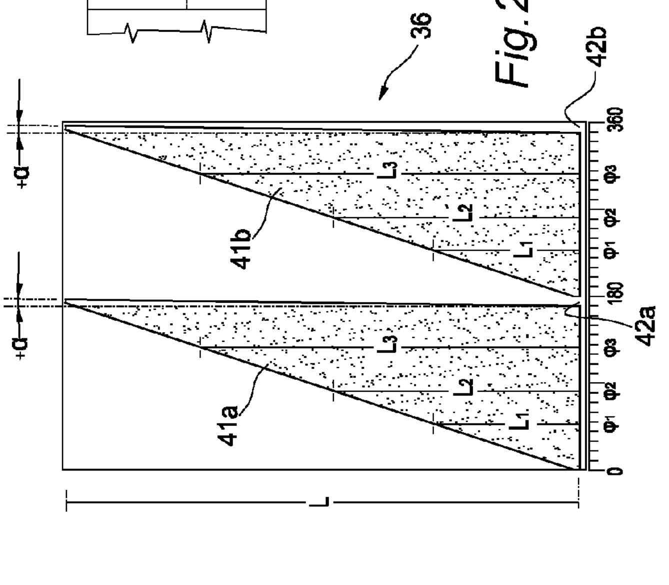
FIG. 2 shows a plan development of the component of FIG. 1*a;*

FIG. 2 represents the plan development of the blade contrast 36, in which the profiles 41*a* and 41*b* extend angularly for approximately 170° each with an axial extension of the sectors increasing in proportion to the angular position "ϕ": in the range from 0° to 170° for the projecting profile 41*a* and from 180° to 350° for the projecting profile 41*b*. The sectors between 170° and 180° and between 370° and 380° correspond in turn to the depressed profiles 42*a* and 42*b*, extended for the whole length of the blade contrast 36. The positioning of the sectors with the depressed profiles in virtual positions of contrast causes a perforating blade 39*a*, 39*b*, in the passage on the flight, result inactive on the continuous form 32.

Figure 3:
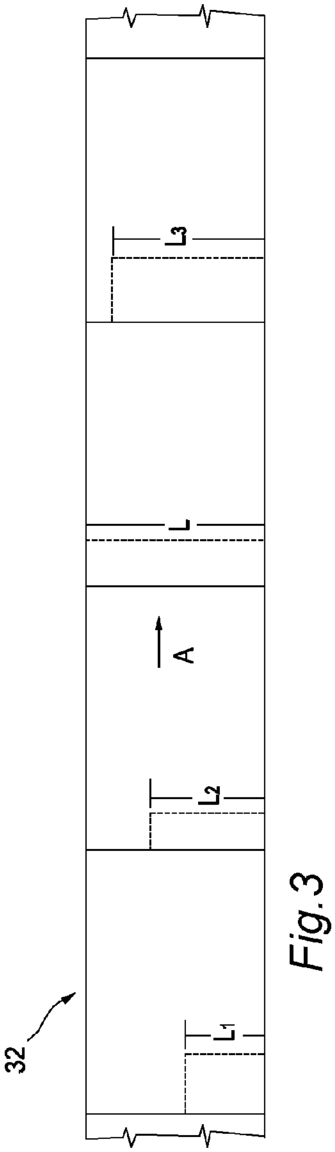
FIG. 3 represents a scheme of a continuous form in movement, perforated by the equipment of FIG. 1.

This configuration of projecting profiles and depressed profiles allows to execute on the form 32 (FIG. 3) transversal perforations L1, L2, L3, of variable length, for angles ϕ1, ϕ2 and ϕ3 of the blade contrast 36 extending from a side conventionally right to a left side of the form 32 up to the maximum length "L". In fact, the positioning in front of the area of perforation "PA" of the sector corresponding to the angle ϕ1, ϕ2, ϕ3 gives rise to the formation of an area of contrast limited to the length L1, L2, L3; the remaining surfaces are inherently spaced away from the movement surface, do not offer any resistance, and avoid perforations in excess of the length L1, L2, L3.

Suitably, the blade support 34 and the blade contrast 36 have their respective axes 37 and 38 inclined of a small angle "α" in a given direction with respect to a directrix perpendicular to the direction of movement "A" of the form 32, while the perforating blades 39*a*, 39*b* have helical cutting edge with an angle equal to that of inclination of the axes. This is for executing the perforations in a progressive manner from side to side of the form, minimizing the efforts of perforation on the various components, in a way known in itself. This angle "α" is between 0.2° and 3° and, preferably, in the range 0.5°-1.5°.

The servocontrol systems provide high precision positioning and synchronization in the blade support and blade contrast. On the other hand, the continuous movement of the form 32 generates errors depending on deformations of the paper in the section between the transport motor members and the perforation assembly. This gives rise to longitudinal positioning errors, acceptable, of the order of 0.8 mm. In the transverse direction, for the inclination of the depressed profiles 42*a* and 42*b*, the error in the length and positioning of the perforations is higher, but remains contained to about 1.5 mm, which represents a value acceptable by the market.

First Variant of the Blade Contrast

Figure 4:
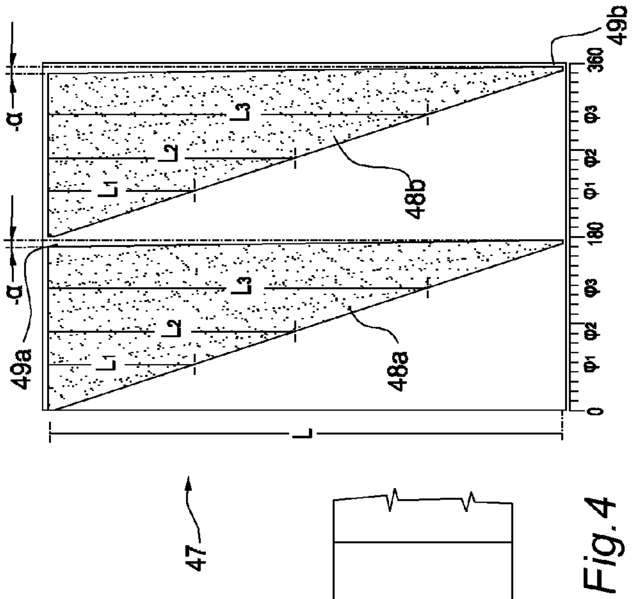
FIG. 4 is a plan development of a first variant of the component of FIG. 1*a;*
Figure 5:
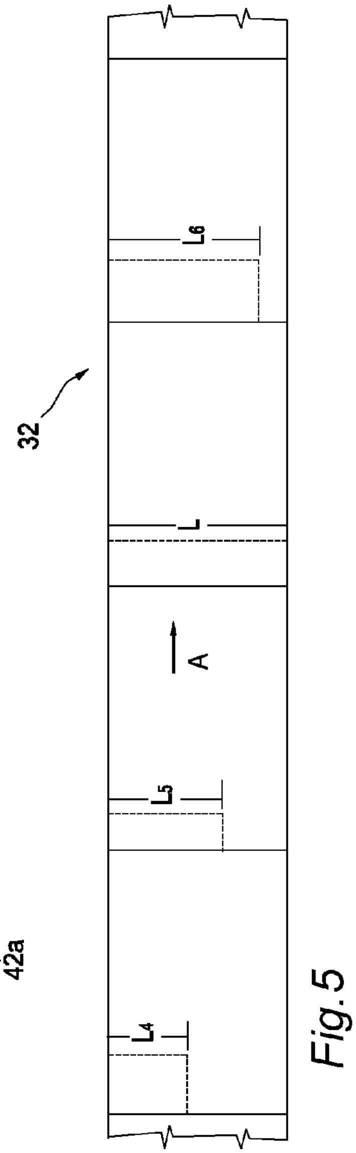
FIG. 5 is a scheme of another perforated continuous form.

FIG. 4 shows the plan development of a blade contrast 47 in accordance with the invention, which constitutes a first variant of the blade contrast 36 of FIG. 1*a*. The blade contrast 47 includes two projecting profiles 48*a* and 48*b*, of contrast for the blades 39*a* and 39*b* and two depressed profiles 49*a* and 49*b* with angular distributions equal to those of the profiles 41*a* and 41*b* and the profiles 42*a* or 42*b*. The sizing is identical to that of the blade contrast 36 and also the axis of rotation 38 is inclined of the angle "α". On the contrary, the axial extensions of the sectors regarding the projecting profiles 48*a* and 48*b* are decreasing with increasing angular position "ϕ". With this arrangement, it is possible to execute on the form 32 (FIG. 5) transversal perforations L4, L5, L6, of variable lengths, which extend from the conventional left side to the-right side of the module.

Second Embodiment of the Invention

Figure 6:
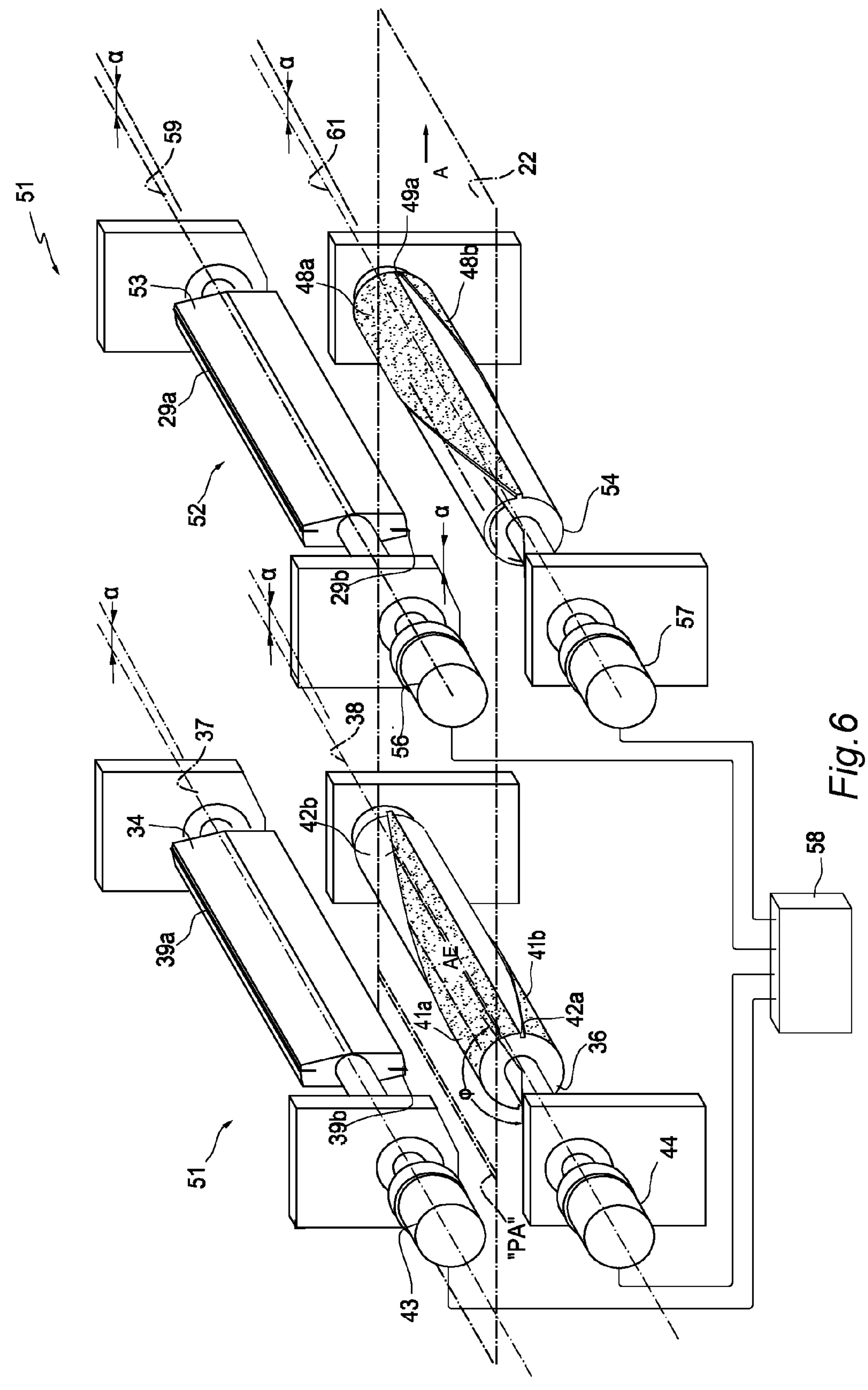
FIG. 6 is a partial scheme of an equipment for transversal perforations according to a second embodiment of the invention.

According to a second embodiment of the invention, is shown in FIG. 6, a perforating equipment 51, similar to the equipment 31 of FIG. 1, in which components identical maintain the same numbering. The equipment 51 comprises, in addition to the perforating group 33, a second perforating group, represented with 52, with a blade support 53, a blade contrast 54, a blade servomechanism 56 and a respective contrast servomechanism 57. The perforating groups 33 and 52 are arranged in cascade and in which the blade support 53 is identical to the blade support 34, while the blade contrast 54 is identical to the blade contrast 47.

Figure 7:
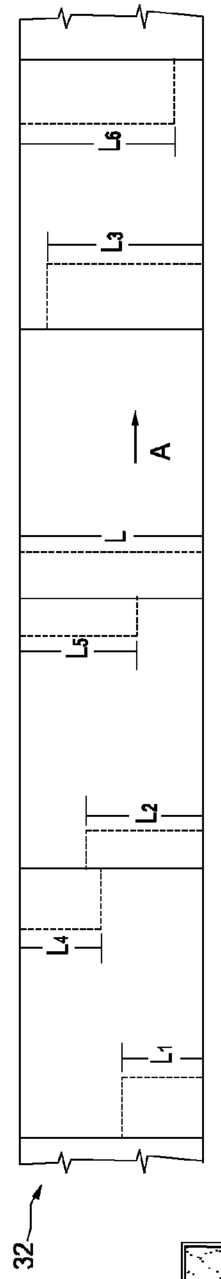
FIG. 7 represents a scheme of a continuous form in movement, perforated by the equipment of FIG. 6.

An electronic control unit 58 is settable to operate on the blade servomechanisms 43 and 56 and the contrast servomechanisms 36 and 57 of the perforating groups 33 and 53 to carry out both the variable perforations L1, L2, L3, starting from the left side of the continuous form 32 (FIG. 7), and the variable perforations L4, L5, L6 starting from the right side, with no compromise in terms of operating speed and distance between the perforations. The axes of the blade support and the blade contrast, represented with 59 and 61, and the perforating blades are also inclined of the angle "α" with respect to the directrix perpendicular to the direction of movement "A", equal to or opposite to the angle of the axes 37 and 38.

Second Variant of the Blade Contrast

Figure 8:
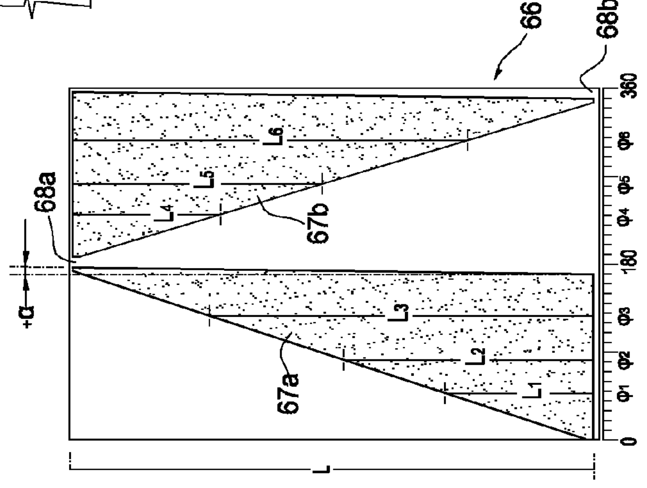
FIG. 8 shows a plan development of a second variant of the component of FIG. 1*a;*

In FIG. 8 is shown a plain development of a second variant of the blade contrast in accordance with the invention, herein represented with 66. The blade contrast 66 includes two projecting profiles 67*a* and 67*b* and two depressed profiles 68*a* and 68*b* having the same extensions of the projecting profiles 41*a* and 41*b* and the depressed profiles 42*a* and 42*b* and the same angular arrangements in the blade contrast 36. In this variant, the axial extensions of the projecting profile 67*a*, in the range from 0° to 170°, is increasing proportionally to the angular position "ϕ" from the end conventionally right to the left end of the blade contrast 66. The length of the profile 67*b*, is also increasing in the range 180° to 350° proportionally to the angular position "ϕ", but from the left to the right end of the blade contrast. With this configuration, also the perforating equipment 31 of FIG. 1 can execute on the form 32 (FIG. 7) both the transversal perforations of length L1, L2, L3, which extend from the side conventionally right to the left side of the form 32 and the perforations L4, L5, L6, which extend from the left to the right side.

Third and Fourth Variant of the Blade Contrast

Figure 9:
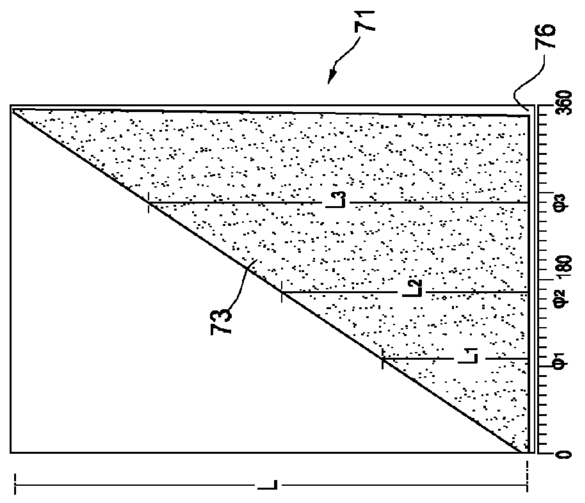
FIGS. 9 and 10 show plan developments of a third and a fourth variant of the component represented in FIG. 1*a;*
Figure 10:
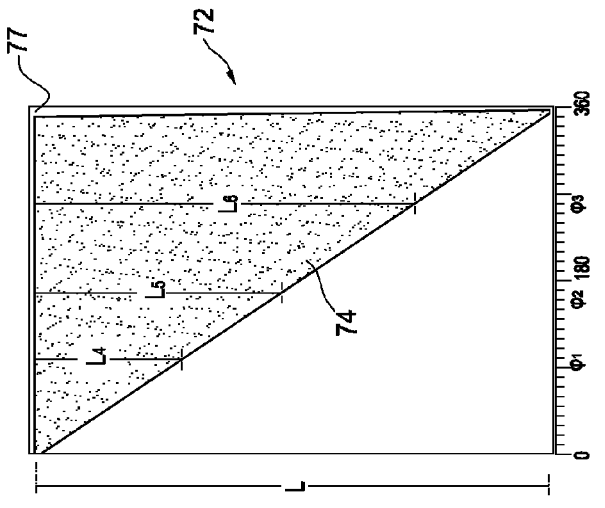

In the FIGS. 9 and 10 are shown the plan developments of a third and a fourth variant of the blade contrast in accordance with the invention, herein represented with 71 and 72: The blade contrasts 71 and 72 are similar to the blade contrasts 36 and 47, but include a single projecting profile 73 and, respectively, a single projecting profile 74, of contrast for one or more perforating blades. The projecting profile 73, 74 extends progressively up to a little less than 360°, and is adjacent to a respective depressed profile 76, 77. With respect to an increasing angular position "ϕ", the axial extension of the projecting profile 73 is increasing while is decreasing the axial extension of the profile 74.

With sizing of the blade contrasts 71 and 72 similar to that of the blade contrasts 36 and 47, with the same precision of the servomechanisms 43 and 44, the error in the length of the perforations L1-L6 in the form 32 is acceptable and of the same order of magnitude (0.8 mm) of the error in the longitudinal positioning.

In an alternative, not shown in the figures, the blade contrast 36 can provide sectors of contrast with axial extensions varying in a discreet way in dependence of predefined angular positions and having lengths and arrangements selected on the basis of requests of perforations selected by the users.

Fifth Variant of the Blade Contrast

Figure 11:
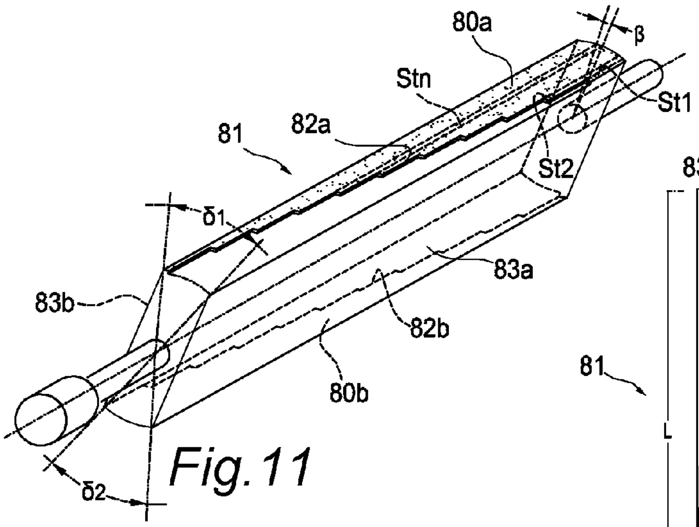
FIG. 11 is a schematic view of a fifth variant of the component of FIG. 1*a;*
Figure 12:
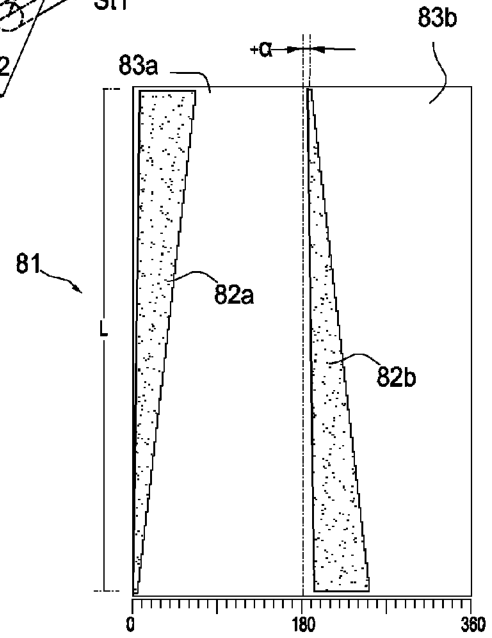
FIG. 12 represents a plan development of the component of FIG. 11.

In FIG. 11 and in a plan development of FIG. 12, is represented with 81 a blade contrast for a perforating equipment 31, in a fifth variant. The blade contrast 81 has a cross section of approximately elongated rectangular shape, similar to that of the support blade 36, with two active cylindrical sectors 80*a* and 80*b* which insist on the section of shorter side. The sectors 80*a* and 80*b* have a diameter equal to that of the blade contrast 36 and limited angular extension "δ1" and "δ2", for example 40°, for a low rotational inertia. The blade contrast 81 defines projecting profiles 82*a* and 82*b* in the active sectors 80*a* and 80*b* and depressed profiles 83*a* and 83*b* between the profiles 82*a* and 82*b*, extending for 140°, inactive for the contrast with the perforating blades. This structure ensures a limited inertia to the blade contrast 81, similar to that of the support blade 36, functional to a quick response of the control servomechanisms and a high perforation speed.

For the best accuracy in the length of the perforations, each projecting profile 82*a* and 82*b* includes step sectors St1, St2, . . . , Stn. The axial extensions of the step sectors are variable in a discreet way in dependence of the their angular positions "ϕ", while are constant in the angular sector "β" of each step sector. The step sectors St1, St2, . . . , Stn of the projecting profiles 82*a* and 82*b* can be configurated so as to obtain the perforations starting from one side or the other of the form 32, as represented in FIG. 11, or be configurated to obtain perforations in intermediate areas between the sides of the form 32. The axial extensions of the various sectors can be sized on the basis of lengths of perforations more used by the users as a de facto standard or on the basis of custom lengths and transversal positions established by the users.

By means of simple adjustments, the blade contrast 81 can be mounted in replacing of the contrast member on a perforating equipment of the type described in the cited patent application TO 2010A000084. This allows also to this equipment a possibility of perforations of variable lengths on the basis of requests of perforations selected by the users, without replacing of mechanical components.

In a perforating equipment 31 which uses the blade contrast 81, for each length and/or perforation position, the perforating blade may operate, without errors depending on angular deviations, on different areas of the step sectors that insist on the projecting profile of the same extension. The operating speed may be very high, with velocity Vm of the continuous form 32 of the order of 300 m/sec.

Conveniently, the electronic control unit can be programmed for operating on the contrast servomechanism so as to vary progressively the phase of the blade contrast 81 in the range of equal axial extension. This is to arrange the areas of contrast in variable positions between the leading edges and the trailing edges of the angular sector or sectors of equal extension of the projecting profile 82*a* or 82*b*, in order to reduce the wear of the same projecting profiles 82*a* and 82*b*.

Sixth Variant of the Blade Contrast

Figure 13:
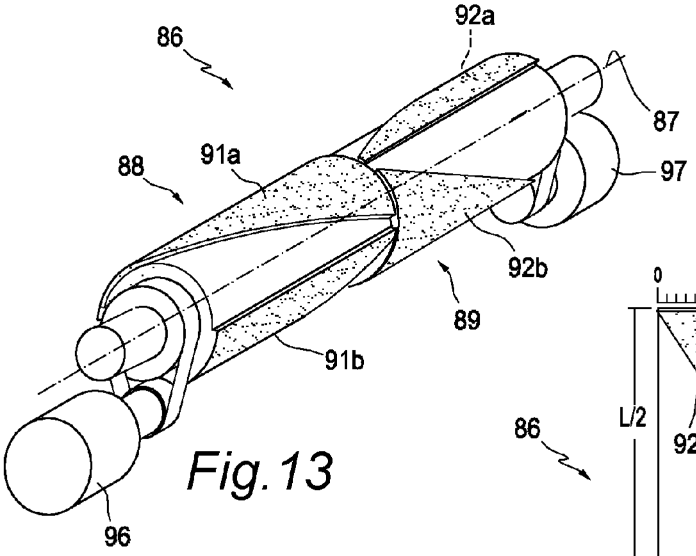
FIG. 13 is a schematic view of a sixth variant of the component of FIG. 1*a;*
Figure 14:
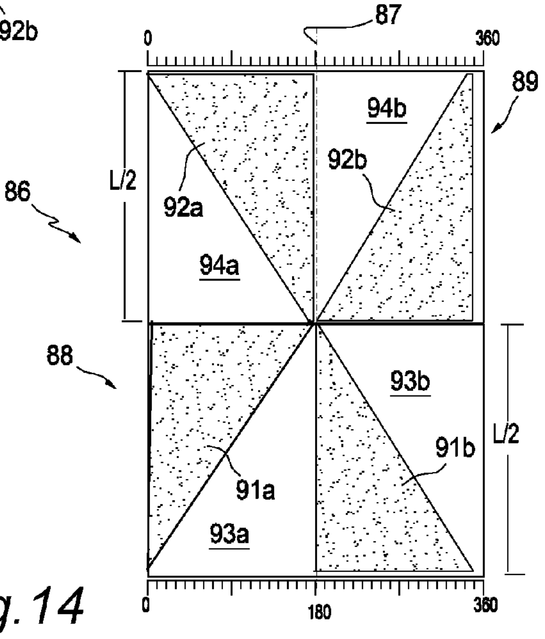
FIG. 14 is a plan development of the component of FIG. 13.
Figure 15C:
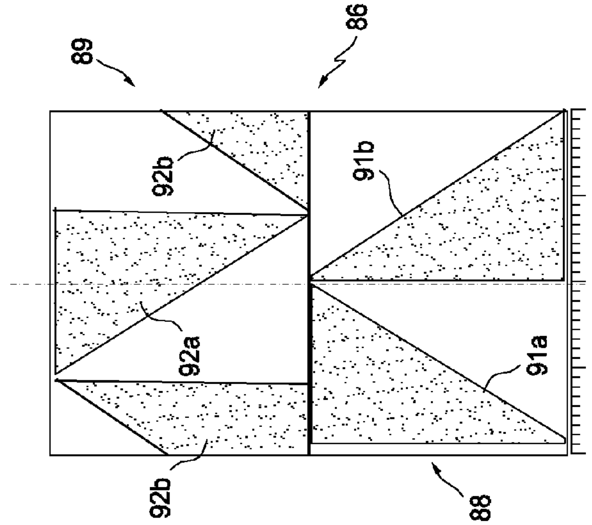
FIG. 15*a*-15*e* represent plan developments of different configurations of the component of FIG. 13.
Figure 15B:
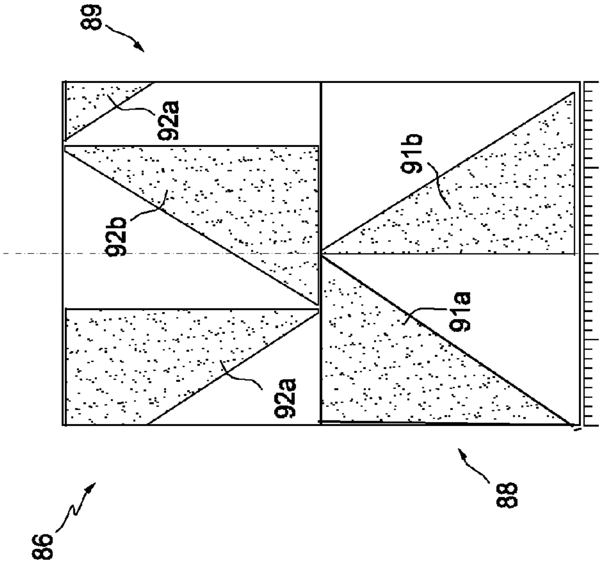
Figure 15A:
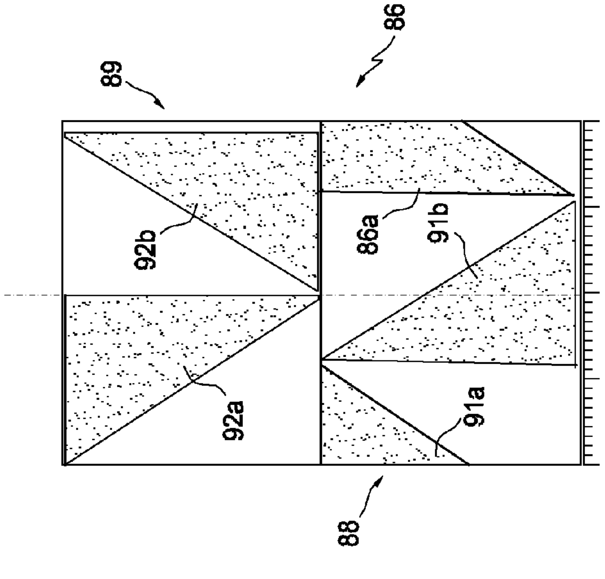
Figure 15E:
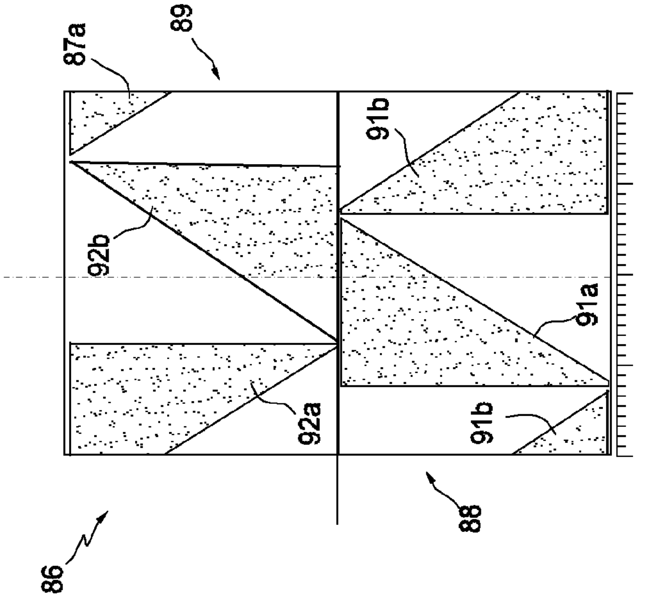
Figure 15D:
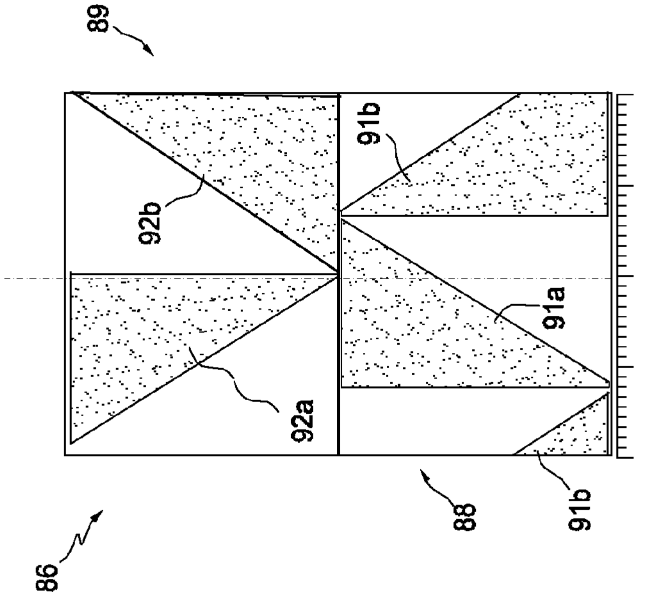

According to a sixth variant of the blade contrast, the equipment of the invention uses a blade contrast 86 (FIG. 13), with the plan development shown in FIG. 14. The blade contrast 86 defines an axis 87, analogous to the axis 37 of the blade contrast 36, divided into two contiguous cylindrical trunks 88 and 89, adjacent along the axis 87. The trunks 88 and 89 include two respective projecting profiles 91*a* and 91*b* and 92*a* and 92*b* and depressed profiles 93*a* and 93*b* and 94*a* and 94*b* between the projecting profiles. Each trunk 88 and 89 is rotated about the axis 87, with phases modifiable individually, by two respective contrast servomechanisms 96 and 97. The maximum extension of the sectors of each of the profiles 91*a* and 91*b* and 92*a* and 92*b* is half the maximum length of perforation "L" of the continuous form 32.

The projecting profiles 91*a* and 91*b* of the first trunk 88 have sectors with axial extensions of increasing length in a range between 0° and 170° and, respectively, decreasing length between 180° and 350° from the end of reference of the contrast blade to the end adjacent to per second trunk 89. The projecting profiles 92*a* and 92*b* of the trunk 89 have similar axial extensions, but of decreasing lengths and, respectively, increasing length from the end of the trunk adjacent to the first trunk to the opposite end of the blade contrast as shown in FIG. 14.

The servomechanisms 96 and 97 modify the respective phases of the trunk 88 and the trunk 89 so as to define a resultant sector, of contrast for the perforating blade, constituted by the sectors of a projecting profile of a single trunk 88 and 89 or by the sectors of the projecting profiles of both the trunks 88 and 89 with variable start and end, for perforations of variable lengths and start of the continuous form 32. The two servomechanisms 96 and 97 are also coordinated so that, at the time of perforation, the overall behavior of the blade contrast 86 is equal to that of the blade contrast 36 of FIG. 1.

Figure 16:
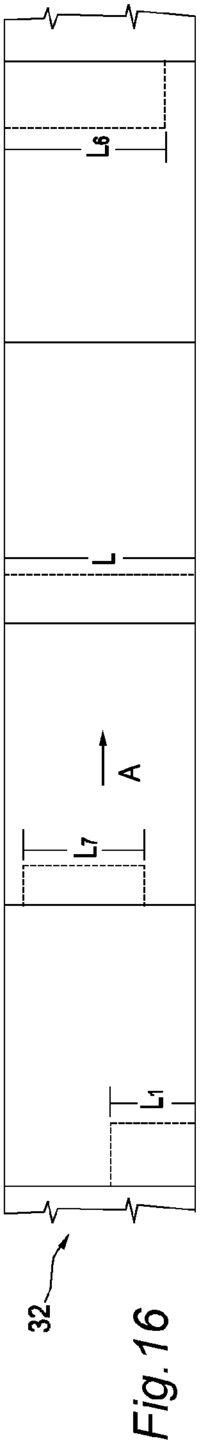
FIG. 16 is a scheme of a continuous form, perforated by an equipment including the component of FIG. 13.

In FIGS. 15*a*-15*e* are shown various configurations of the blade contrast 86 having different reciprocal phases of the trunks 88 and 89. Using combinations of various phases, it is possible to realize in the continuous form 32 (FIG. 16) the lengths of perforations from L1 to L6, already considered, starting from the two sides of the form and perforations L7 with start and end in distant parts of these sides.

Seventh Variant of the Blade Contrast

According to a seventh variant, the perforating equipment 31 of the invention comprises the perforating group 33 with the blade support 34 and a blade contrast 101 (FIG. 13), with low inertia, provided for rotating about the respective parallel axes 37 and 38. The blade contrast 101 comprises a hollow cylinder 102 and a support shaft 103 with axes coinciding with the axis 37 and a series of ribs 104 integrally connected between the cylinder 102 and the shaft 103. The hollow cylinder defines projecting profiles, of contrast for the blades 39*a* and 39*b*, and depressed profiles similar to the corresponding elements of the blade contrast 36 or the variants described above.

The constituent parts of the blade contrast 101 are dimensioned so as to minimize the rotational inertia, without affecting the uniformity of perforation, along the entire width of the continuous form 32.

Third Embodiment of the Invention

Eight Variant of the Blade Contrast

Figure 18:
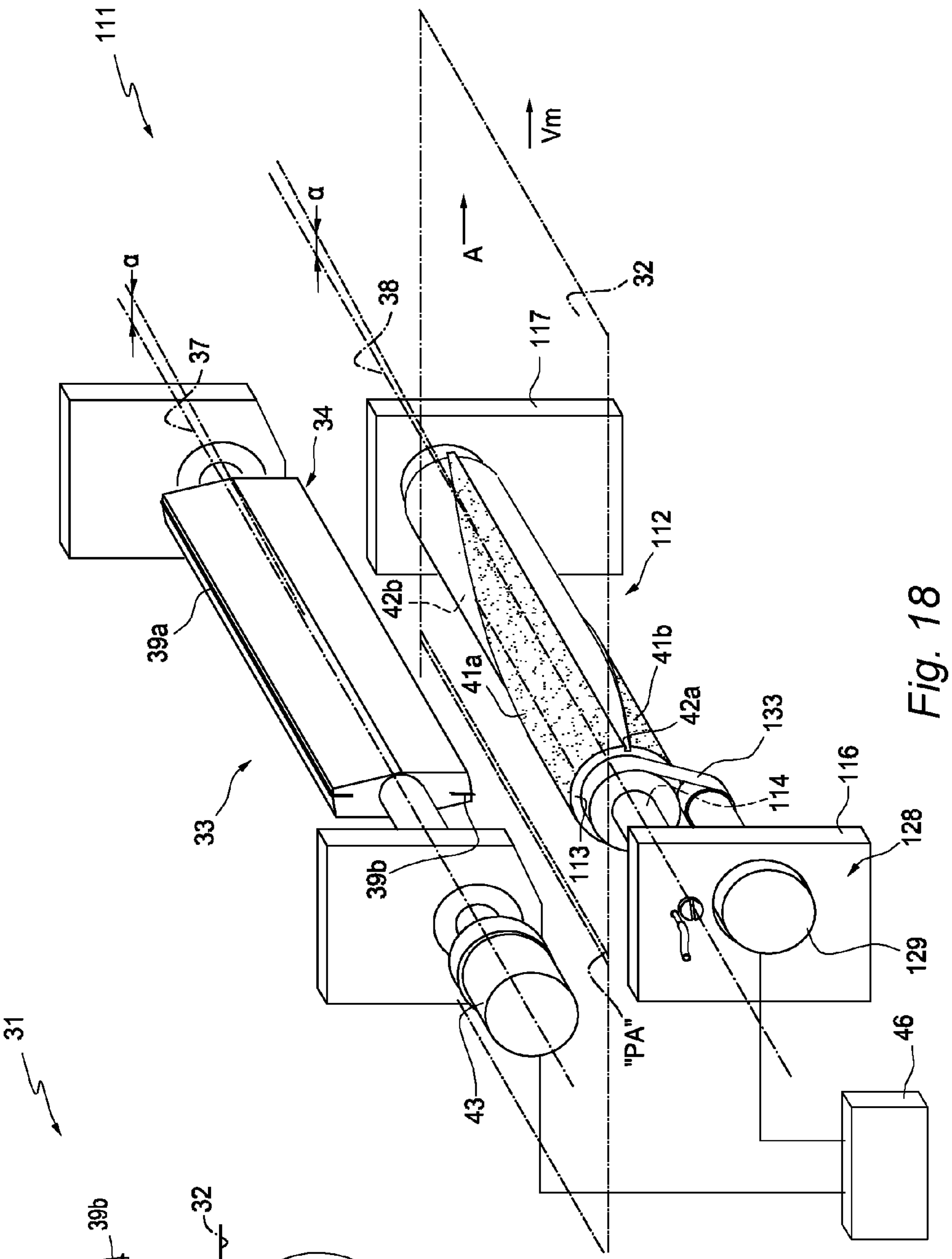
FIG. 18 represents a partial scheme of an equipment for transversal perforations according to a third embodiment of the invention and comprising an eight variant of the component of FIG. 1*a;*
Figure 17:
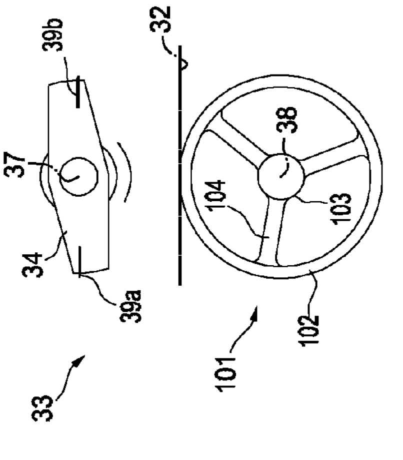
FIG. 17 shows a partial lateral view of an equipment for transversal perforations with a seventh variant of the component of FIG. 1*a;*
Figure 19:
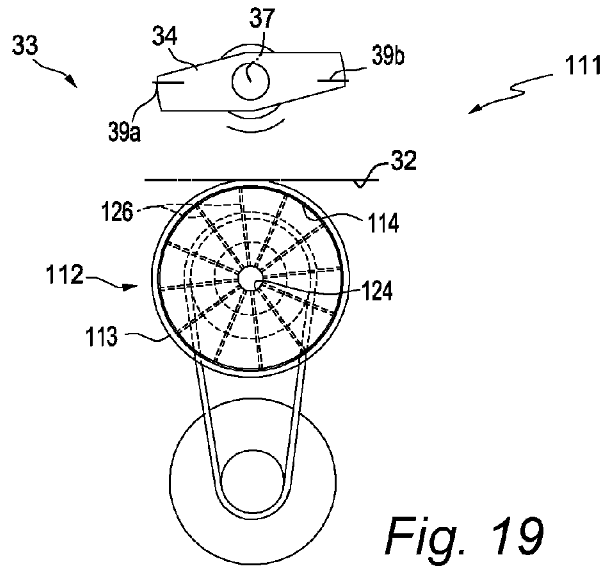
FIG. 19 is a partial lateral view of the equipment of FIG. 18.
Figure 20:
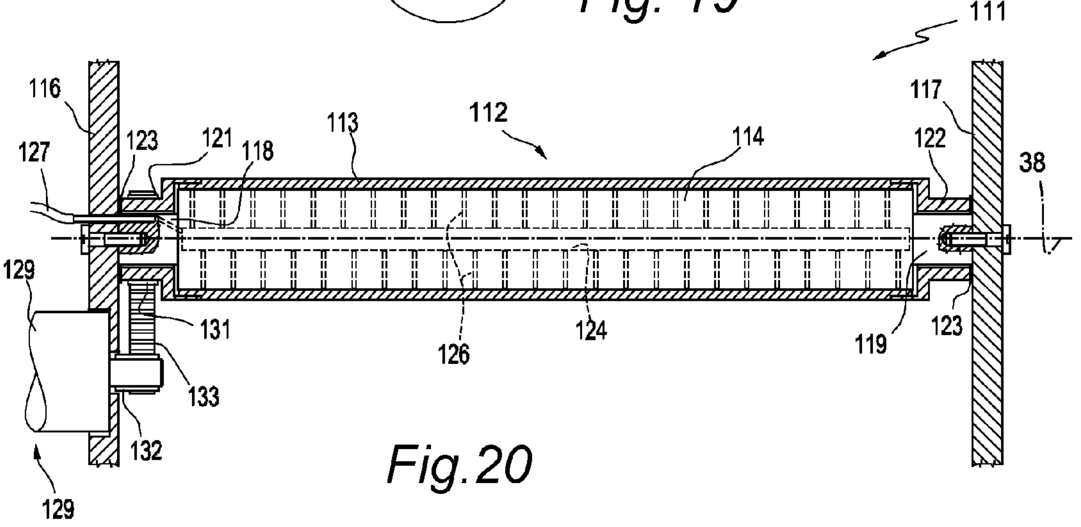
FIG. 20 is a partial front section of the equipment of FIG. 18.

According to a third embodiment of the invention, is shown in FIG. 18, a perforating equipment 111, similar to the equipment 31 of FIG. 1, in which components identical maintain the same numbering. The equipment 111 comprises the perforating group 33 with the blade support 34 and a blade contrast 112 (FIGS. 18, 19 and 20), with low inertia, provided for rotating about the respective axes 37 and 38.

The blade contrast 112 represents an eight variant of the blade contrast 36 and comprises a hollow cylinder or sleeve 113 with projecting profiles, of contrast for the blades 39*a* and 39*b*, and depressed profiles similar to the corresponding elements of the blade contrast 36 or the blade contrasts 47, 54, 66 and 71 previously described. The hollow cylinder 113 is rotatable about a support shaft 114, without mechanical contact, according to a structure constituting a radial air bearing of pneumostatic type.

The shaft 114 is fixed between sides 116 and 117 of the equipment 111 through cylindrical tails 118 and 119 and respective fixing elements. The hollow cylinder 113 comprises terminal caps having hubs 121 and 122 and is suspended for pneumatic action, with an inner surface thereof on the shaft 114 and with the inner surfaces of the hubs 121 and 122 on the tails 118 and 119. The components are of steel of high hardness and the internal surfaces of the hollow cylinder 113 and the hubs 121 and 122 are mirror finished and with tolerances such as to ensure that the gap of separation is of the order of 5-10 micron.

The thickness of the hollow cylinder 113 is limited to a value sufficient to prevent irregularities in the perforations at the moment of impact of the blade with the projecting profile. The support shaft 114 is of high cross-section, such as to prevent corresponding flexural deformations. For example, the hollow cylinder 113 has a thickness from 3.5 mm to 6 mm, typically 5 mm, while the support shaft has a diameter of 40-60 mm, typically 50 mm. With these values, the rotational inertia of the blade contrast 112 is similar to that of the blade support 34. Optionally, between the ends of the hubs 121 and 122 and the sides 116 and 117 are interposed washers 123, of calibrated thickness, so as to maintain the distance between the hubs and the sides within pre-defined limits, recovering machining and mounting tolerances in the distance between the sides 116 and 117.

For the pneumostatic function, the equipment 111 is connected to a compressed air source, not shown in the drawings, while the shaft 114 has an axial duct 124 and a series of radial ducts 126 of communication with the conduit 124. A pipe 127 connects the duct 124 with the compressed air source, while the radial ducts 127 are open toward the space or gap of separation between the shaft 114 and the hollow cylinder 113, for the generation of the pneumostatic action on the hollow cylinder.

The compressed air is conveniently dehumidified and filtered and supplied to a pressure of 4-15 bar. In the use, the compressed air incoming from the pipe 127 flows through the axial duct 124, the radial ducts 126 and the gap between cylinder 113 and shaft 114 and between hubs 122 and 123 and tails 118 and 119, and escapes through the spaces between the washers 123 and the sides 116 and 117.

A contrast servomechanism 128, similar to the contrast servomechanism 44 includes a motor 129 which operates on the hollow cylinder 113 of the blade contrast 112 via a toothed crown 131 of the hub 121 and a pinion drive motor 132 and a toothed belt 133.

A structure of this type allows to have a blade contrast of very limited inertia, similar to that of the blade support 36 and subjected to minimum friction. The servomechanism 128 has therefore an extremely rapid response and can make use of components of limited power.

Ninth Variant of the Blade Contrast

Figure 21:
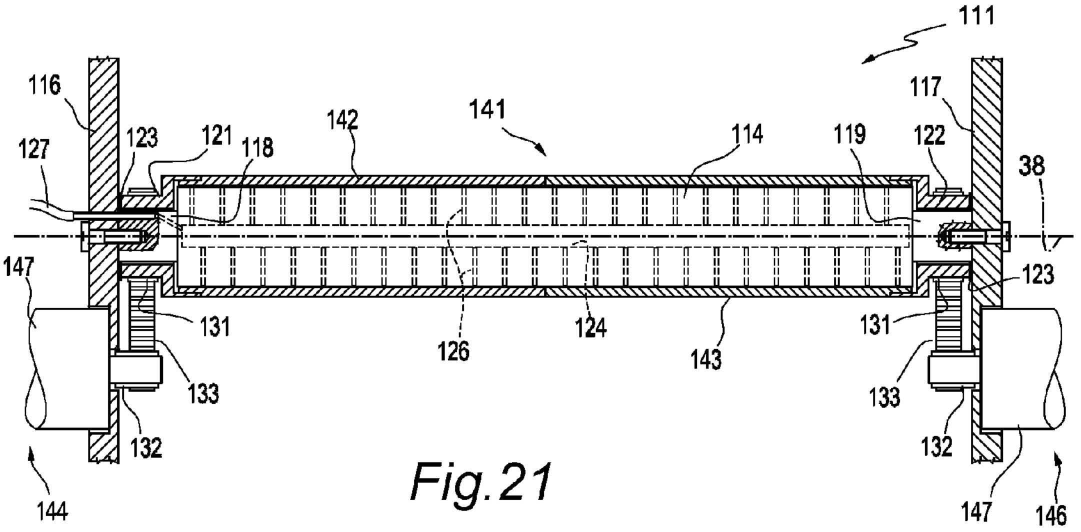
FIG. 21 shows a partial front section of the equipment of FIG. 18 with a ninth variant of the component of FIG. 1*a;*

According to a ninth variant of the blade contrast, the perforating equipment 111 uses a blade contrast 141, (FIG. 21), with pneumostatic suspension similar to that of the blade contrast 112. The blade contrast 141 is formed by two contiguous trunks of cylinder 142 and 143, adjacent along the axis 38, which are rotatable, without mechanical contact, around the support shaft 114. The trunk 142 is delimited by the terminal cap, with the hub 121 rotatable around the tail 118, while the trunk 143 is delimited by the cap with the hub 122 rotatable around the tail 119.

The trunks of cylinder 142 and 143 include two respective projecting profiles and depressed profiles between the identical projecting profiles to the projecting profiles 91*a* and 91*b* and 92*a* and 92*b*, and to the depressed profiles 93*a* and 93*b* and 94*a* and 94*b* of the blade contrast 86 of FIG. 13. The trunks 142 and 143 are rotated around the support shaft 114, as air bearings, with phases individually modifiable by two respective contrast servomechanisms 144 and 146, similar to the contrast servomechanism 128. Each servomechanism 144, 146 includes a motor 147 which operates on the trunk 142, 143 through a toothed crown 131 of the hub 121, 122 and a transmission with a motor pinion 132 and a toothed belt 133. The structure of the blade contrast 141 allows to have an inertia half that of the blade contrast 112, which is also subject to minimum friction, particularly for small powers for the servomechanisms 144, 146 and absolute freedom in the size and positioning of the perforations.

As for the blade contrast 86, the maximum extension of the sectors of each of the projecting profiles is equal to half the maximum length of perforation "L" of the continuous form 32. For the length and the positions of the perforations, the operation of the blade contrast 141 is identical to that of the blade contrast 86.

In summary, the increasing profile and the decreasing profile of the first trunk 142 have axial extensions of increasing lengths and, respectively, decreasing from an end of reference of the blade contrast 141 to one end of the trunk 142 contiguous with the second trunk 143. The increasing profile and the decreasing profile of the second trunk have axial extensions of increasing length and, respectively, decreasing length from one end contiguous with the trunk 142 to one end of the blade contrast opposite to the end of reference. The respective angular positions of the trunk 142 and the trunk 143 are modifiable so as to define a resulting sector, of contrast for a perforating blade 39*a*, 39*b*, which is constituted by sectors of the projecting profiles of the two trunks, having variable start and end, for perforations of the continuous form (32) having freely selectionable lengths (L1, L2, . . . , L7) and transversal positions.

For what it concerns to the dimensioning of the parts and the way of operating as air bearing, the blade contrast 141 is similar to the blade contrast 112. The air incoming from the pipe 127 flows through the axial duct 124, the radial duct s 126 and the spaces between the trunks 142 and 143 and the shaft 114 and between the hubs 122 and 123 and the tails 118 and 119 and escapes through the spaces between the washers 123 and the sides 116 and 117 and through the space between the trunks 142 and 143. If deemed appropriate, the adjacent ends of the trunks 142 and 143 can be shaped as labyrinth, in order to minimize the escape of air between the trunks.

Also the perforating equipment 111 with the blade contrast 141 or 142 allows to obtain very high perforation speed with feeding velocity Vm of the continuous form 32 of the order of 300 msec.

Tenth and Eleventh Variant of the Blade Contrast

Figure 22:
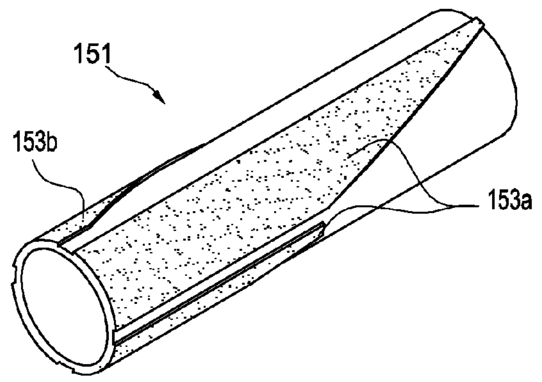
FIG. 22 is the schematic view of a tenth variant of the component of FIG. 1*a;*
Figure 23:
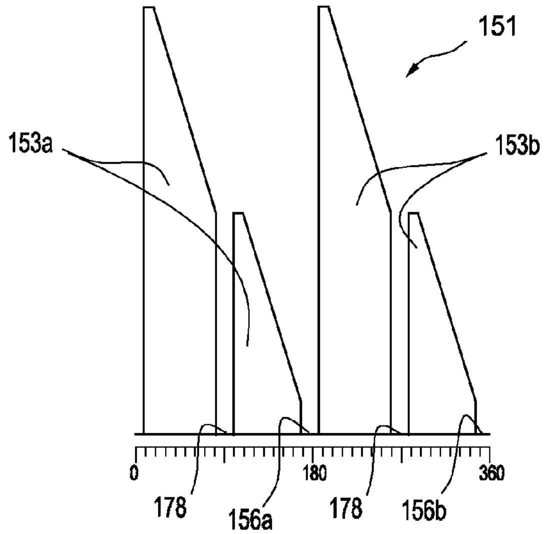
FIG. 23 shows a plan development of the component of FIG. 22.
Figure 24:
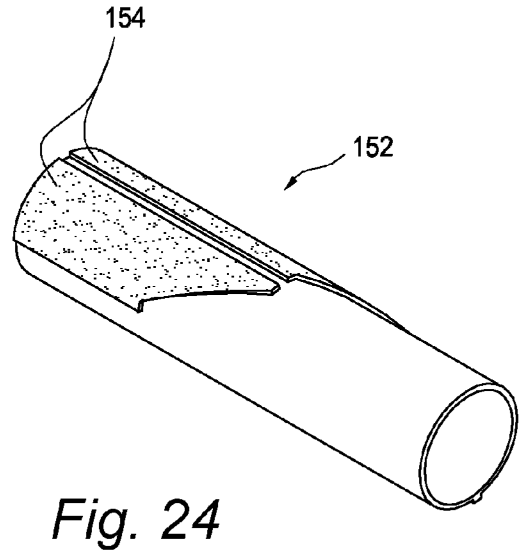
FIG. 24 is a schematic view of an eleventh variant of the component of FIG. 1*a*.
Figure 25:
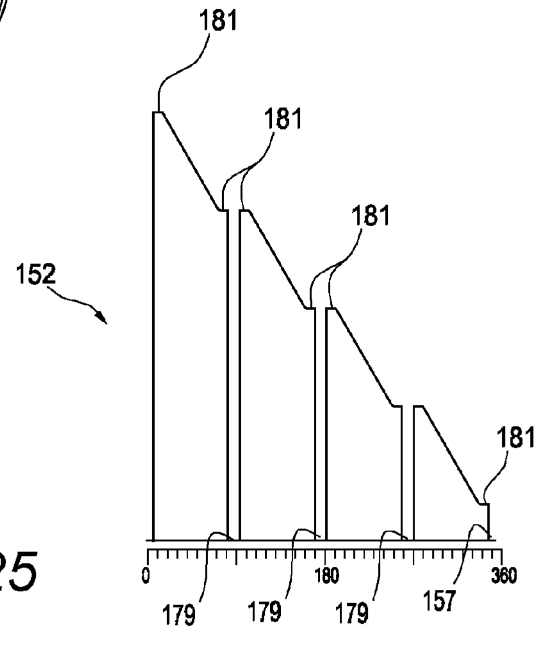
FIG. 25 is a plan development of the component of FIG. 24.

In FIGS. 22 and 24 and in FIGS. 23 and 25 are shown a tenth and an eleventh variant of the blade contrast, here represented with 151 and 152 and the respective plain developments.

The blade contrasts 151 and 152 have two projecting profiles 153*a* and 153*b* and, respectively, a single projecting profile 154 and depressed profiles 156*a* and 156*b* and 157. These profiles are similar to the projecting profiles 41*a* and 41*b* and 74 and the depressed profiles 42*a* and 42*b* and 76 of the blade contrast 36 of FIG. 1*a* and the blade contrast 71 of FIG. 9. Also the projecting profiles 153*a* and 153*b* and 154 have axial extension with continuous variation depending on their angular position but, on the contrary of the profiles 41*a* and 41*b* and 74, the profiles 153*a* and 153*b* and 154 are interrupted in correspondence of two or more angular sectors with depressed profiles 178 and 179.

The depressed profiles 178 and 179 are such as to allow the inactive passage of the perforating blades, in the case of blades in continuous movement for high speed perforations. The projecting profiles 153*a* and 153*b* and 154 are configurated so as to have a same axial extension upstream and downstream of each interruption. This allows the user to ensure the maximum freedom in setting the length of perforation. The presence of the profiles 178 and 179 in turn allows to execute rotations of small value when the blade contrasts 151 and 152 must be rotated from the position regarding the last perforation to a position for the idle run of the blade.

To prevent that small errors of angular positioning can determine absence of perforation, the projecting profiles 154 can be shaped so that, upstream and downstream of the depressed profiles 167 and 179, are present small angular sectors 181 with identical axial extensions, as represented in FIG. 25.

Naturally, the principle of the invention remaining the same, the embodiments and the details of construction can broadly be varied with respect to what has been described and illustrated, by way of non-limitative example, without by this departing from the ambit of the present invention.

By way of example, the equipment of the invention with solid cylindrical contrast blades may provide a mechanism (not shown in the figures) for shifting the blade contrast with respect to the blade support, between a condition of perforation, of contrast for the blade, and an inoperative condition of disengagement for the blade. The blade servomechanism can maintain the blade in movement after the perforation and selectively execute an idle run of the blade between two adjacent perforations. In this case the projecting profiles will be absolutely continuous. A perforating equipment with a transversally shiftable blade contrast has been described in the Italian patent application TO 2009A000101, filed on 11 Feb. 2009 in the name of the applicant Tecnau S.r.l, and the content of which is herein included for reference.

The contrast servomechanism and the electronic control unit can modify the phase of the blade contrast, to make operative for the contrast one of the projecting profiles having axial extension equal to the desired length of the perforations.

The contrast servomechanism can directly actuate the rotation of the blade contrast, or to only modify the phase, by means of a differential mechanism, in the case where the blade contrast is rotated in synchronism with the form in movement.

The equipment of the invention can also be used for executing of transversal cuts on the form, for example die cutting, with the simple substitution in the blade support of the perforating blade, typically indented, with a blade having a continuous cutting edge.

As a further variant, the equipment for transverse perforations of the invention provides a contrast blade with one or more projecting profiles according to one of the above described solutions, having possibility of axial shifting and controlled by a further servomechanism. This servomechanism is settable to define a suitable axial position of the contrast blade such to define the start of the perforation on a whatsoever transversal position of the continuous form. This further variant allows to make completely free the start and the end of the desired perforations, while maintaining the freedom of selection of the corresponding lengths.

The invention claimed is:

1. An equipment for high speed transversal perforations of variable lengths on a continuous form in movement, comprising a blade support with at least a perforating blade, a blade contrast having at least one projecting profile of contrast for the perforating blade, wherein the blade support and the blade contrast have rotation axes parallel one another and possibility of rotation around the respective rotation axes transversally to a direction of movement (A) of the form, and servomechanisms for rotating the blade support and the blade contrast to carry a perforating blade against the projecting profile, in synchronism with the form, wherein the perforating blade extends transversely to the form and has a length suitable for transversal perforations of maximum length (L) of the form;

the blade contrast comprises a hollow cylinder of low rotational inertia, and in which said hollow cylinder defines the projecting profile or the projecting profiles, on a lateral surface of the hollow cylinder;

the projecting profile has sectors on respective angular positions (ϕ) of the hollow cylinder from a reference position with axial transversal extensions parallel to said rotation axes and of increasing length or of decreasing length dependent on the respective angular positions (ϕ) from said reference position; and the servomechanisms include a contrast servomechanism provided for selecting an angular position (ϕ) of the hollow cylinder from said reference position, such to position, for the contrast with the perforating blade, one of said sectors of the projecting profile having one of said transversal axial extensions equal to the requested length of the perforation for perforations of the continuous form having freely selectionable lengths; and in which the hollow cylinder is rotatable around a support shaft according to a structure including radial ducts of said support shaft under compressed air, open toward said hollow cylinder and constituting a radial air bearing of pneumostatic type between the hollow cylinder and said support shaft.

2. Equipment according to claim 1, wherein said hollow cylinder has a thickness limited to a value sufficient to prevent irregularities to the perforations on the contrast of the blade with the projecting profile, while said support shaft is of high transversal section, such to be prevent flexural deformations during the perforations.

3. Equipment according to claim 1, wherein said hollow cylinder has a thickness of 3.5 mm to 6 mm, while the support shaft has a diameter in a range of 40 mm to 60 mm.

4. Equipment according to claim 1, wherein the hollow cylinder and the support shaft are made of high hardness steel, and wherein the internal surface of the hollow cylinder and the external surface of the fixed shaft are mirror finished and with tolerances such to ensuring a space of separation of the order of 5-10 micron.

5. Equipment according to claim 1, further comprising mounting sides for the blade contrast, wherein the support shaft is fixed between said sides through two cylindrical terminal tails, the hollow cylinder includes two terminal caps having hubs suspended on said tails for a pneumostatic action, and the contrast servomechanism operates on one of the hubs for the rotation of the hollow cylinder, and wherein washers of calibrated thickness are optionally provided between the mounting sides and the tails so as to maintain the axial distance between the hubs and the mounting sides within low pre-defined limits.

6. Equipment according to claim 1, further comprising a source of compressed air, wherein said support shaft defines an axial duct of communication with the radial ducts, and wherein said axial duct is connected with the source of compressed air for the generation of the pneumostatic action on the hollow cylinder.

7. Equipment according to claim 1, wherein the axial extension of the projecting profile or the axial extension of each projecting profile varies in a continuous way in dependence on the angular position (ϕ) of said hollow cylinder, in which the projecting profile is interrupted by sectors with depressed profiles for a condition of idle run of the perforating blade and in which the projecting profile is configured so as to have sectors with a same axial extension upstream and downstream from the sectors with depressed profiles.

8. An equipment for high speed transversal perforations of variable lengths on a continuous form in movement, comprising a blade support with at least a perforating blade, a blade contrast having at least one projecting profile of contrast for the perforating blade, and servomechanisms for rotating the support blade and the blade contrast to carry a perforating blade against the projecting profile, in synchronism with the form, wherein the perforating blade has a length suitable for perforations of maximum length (L) of the form;

the blade contrast comprises a hollow cylinder of low rotational inertia, and in which said hollow cylinder defines the projecting profile or the projecting profiles, on a lateral surface of the hollow cylinder;

the projecting profile has sectors on respective angular positions ($\phi$) of the hollow cylinder and having axial extensions dependent on the respective angular positions ($\phi$); and the servomechanisms include a contrast servomechanism provided for selecting an angular position of the hollow cylinder, such to position, for the contrast with the blade, a sector of the projecting profile having axial extension equal to the requested length of the perforation; and in which said hollow cylinder is rotatable around a support shaft under compressed air according to a structure constituting a radial air bearing of pneumostatic type;

wherein the hollow cylinder includes two adjacent sleeve sections of cylinder at a micrometric axial distance the one from the other and suspended, for a pneumostatic action, on the support shaft;

wherein each sleeve section has two projecting profiles of contrast for a perforating blade and in which each sleeve section is individually rotated with angular positions selectionable by a respective contrast servomechanism;

wherein the projecting profiles of each sleeve section include each one an increasing profile and a decreasing profile;

wherein the increasing profile and the decreasing profile of a first sleeve section have axial extensions of increasing lengths and, respectively, of decreasing lengths from a reference end of the blade contrast to an end of the first sleeve section adjacent with the second sleeve section, while the increasing profile and the decreasing profile of the second sleeve section have axial extensions of increasing lengths and, respectively, of decreasing lengths from an end adjacent to the first sleeve section to an end of the blade contrast opposite to the reference end;

wherein the respective angular positions of the first sleeve section and the second sleeve section are modifiable so as to define a resultant sector, of contrast for a perforating blade; and wherein said resultant sector is constituted by sectors of the projecting profiles of the first sleeve section and the second sleeve section, having starting and ending variable for perforations of the continuous form having freely selectionable lengths and transversal positions.

9. Equipment according to claim 8, wherein the axial extension of said projecting profiles on each sleeve section has a maximum value equal to a half of the maximum length of perforation (L) of the continuous form.

10. Equipment according to claim 8 further comprising mounting sides for the blade contrast, wherein the support shaft is fixed between said sides through two cylindrical terminal tails, the hollow cylinder includes two terminal caps for the first sleeve section and the second sleeve section having first hub and a second hub, respectively, suspended on said tails for a pneumostatic action, and the contrast servomechanism operates on one of the first hub and the second hub for the rotation of the hollow cylinder, wherein the first sleeve section is delimited by the first terminal cap with the first hub rotatable around a first of said terminal tails, while the second sleeve section is delimited by the second terminal cap with the second hub rotatable around a second of said terminal tails, and wherein said first sleeve section and said second sleeve section are rotated around the support shaft by two respective contrast servomechanisms, while the compressed air escapes through spaces adjacent to axial ends of said first sleeve section and said second sleeve section.

11. An equipment for transversal perforations of varying lengths on a continuous form in movement, comprising a blade support with at least a perforating blade, a blade contrast comprising a hollow cylinder and having at least one projecting profile defining a cylindrical surface of contrast for the perforating blade, a blade servomechanism, and a contrast servomechanism, wherein the blade support and the blade contrast have rotation axes parallel one another and possibility of rotation around the respective rotation axes transversally to a direction of movement (A) of the form, and wherein the blade servomechanism and the contrast servomechanism rotate the blade support and the blade contrast to carry the perforating blade in interference with a projecting profile, in synchronism with the form, wherein:

the perforating blade has a blade length extending transversely to the form in movement and suitable for the perforations of maximum length (L) of the form; and wherein the projecting profile has sectors on respective angular positions ($\phi$) of the blade contrast extending from a reference position and said projecting profile has axial transversal extensions parallel to said rotation axes increasing or decreasing in dependence on the respective angular positions ($\phi$) with respect to said reference position, and wherein the contrast servomechanism is settable for selecting an angular phase of the blade contrast, such to positioning, for the contrast with the perforating blade, a sector of the projecting profile having one of said axial extensions equal to a requested length for the executing of the perforation less than said blade length.

12. Equipment according to claim 11, wherein the blade contrast has at least a depressed profile, inactive for the contrast with the perforating blade or the perforating blades, wherein said servomechanism is settable for a condition of perforation, such to positioning the blade contrast for a condition of interference of the blade with the projecting profiles, and for a condition of idle run of the blade, such to positioning the depressed profile or one of the depressed profiles of the blade contrast in front of the area of perforation of the form and jumping of the perforation.

13. Equipment according to claim 11, wherein the axial extension of the projecting profile or the axial extension of each projecting profile varies in a continuous way in dependence on its angular position ($\phi$).

14. Equipment according to claim 13, wherein the axial extension of the projecting profile or the axial extension of each projecting profile varies in a continuous way in dependence on its angular position ($\phi$), the projecting profile of the blade contrast is interrupted by sectors with depressed profiles for the condition of idle run of the blade, and wherein the projecting profile is configured so as to provide a same axial extension upwards and downwards the sectors with depressed profiles, sided by small sectors with identical axial extension.

15. Perforating equipment according to claim 11 further comprising two perforating groups, each one with a blade support and a blade contrast, a respective blade servomechanism and contrast servomechanism, and wherein the blade contrast of one of said perforating groups has projecting profiles with axial extensions of lengths increasing from a reference end to an opposite end of the blade contrast, while the blade contrast of the other perforating group has projecting profiles with axial extensions of lengths increasing from the opposite end to the reference end, and wherein the blade servomechanism and the contrast servomechanism of the one or the other perforating group are settable for effecting perforations of varying lengths starting from the reference side and from the opposite side of the continuous form.

16. Equipment according to claim 11, wherein said blade contrast comprises a hollow cylinder and a support shaft, and wherein said hollow cylinder is mounted on said support shaft by means of a series of ribs.

17. Equipment according to claim 11, wherein said blade contrast comprises a hollow cylinder or a sleeve section of a hollow cylinder, and the hollow cylinder or each sleeve section of a hollow cylinder defines the projecting profile or the projecting profiles on a lateral surface thereof, and wherein the hollow cylinder or each sleeve section of a hollow cylinder is rotatable around a support shaft according to a structure including radial ducts of said support shaft under compressed air, open toward said hollow cylinder and defining a radial air bearing of pneumostatic type.

18. Equipment according to claim 11, wherein the projecting profile or each projecting profile of the blade contrast includes stepped sectors, and wherein the axial extensions and/or the positions of said stepped sectors are variable in discreet way depending on their angular positions ($\phi$), while the axial extensions are constant in the angular sector ($\beta$) of each stepped sector.

19. Equipment according to claim 18, wherein the blade support and the blade contrast have transversal sections with active sectors of limited angular extension for a limited rotational inertia, and wherein the blade support mounts two perforating blades on the active sectors, said equipment being characterized by the fact that the blade contrast defines two projecting profiles with said stepped sectors on the respective active sectors of limited angular extension and two depressed profiles between the projecting profiles, inactive for the contrast with the perforating blades.

20. Equipment according to claim 18 wherein, for each requested length of perforation and/or for each perforation position, a perforating blade can operate on different areas of the projecting profile of equal axial extension and in that the contrast servomechanism is settable for selecting the angular position ($\phi$) of the blade contrast so as to arrange the areas of contrast in positions varying between the leading edges and the trailing edges of the angular sector ($\beta$) of equal axial extension.

21. Equipment according to claim 11, wherein the rotation axes of the support blade and the blade contrast are inclined of a few ($\alpha$) in a given sense with respect to a directrix perpendicular to the direction of movement (A) of the continuous form, while the perforating blade has a helix cutting edge with an inclination angle ($\alpha$) equal to the inclination angle of the axes, in order to effect the perforations, in progressive way from a side to the other of the form, according to a direction congruent with the sense of inclination of said rotation axes.

22. An equipment for transversal perforations of varying lengths on a continuous form in movement, comprising a blade support with at least a perforating blade, a blade contrast comprising a hollow cylinder and having at least one projecting profile of contrast for the perforating blade, a blade servomechanism, and a contrast servomechanism, wherein the blade support and the blade contrast have possibility of rotation transversally to a direction of movement (A) of the form, and wherein the blade servomechanism and the contrast servomechanism rotate the blade support and the blade contrast to carry the perforating blade in interference with a projecting profile, in synchronism with the form, wherein:

the perforating blade has a length suitable for the perforations of maximum length (L) of the form; and wherein the projecting profile has sectors on respective angular positions ($\phi$) of the blade contrast, and having axial extensions dependent on the respective angular positions ($\phi$), and wherein the contrast servomechanism is settable for selecting an angular phase of the blade contrast, such to positioning, for the contrast with the perforating blade, a sector of the projecting profile having axial extension equal to a requested length of the perforation, wherein the blade contrast has two projecting profiles, a projecting profile of said projecting profiles defines angular sectors with axial extensions of lengths increasing from a reference end to an opposite end of the blade contrast, while another projecting profile of the projecting profiles defines angular sectors with axial extensions of lengths increasing from the opposite end to the reference end of the blade contrast, for angular positions increasing according to a given sense of reference, to the end of executing perforations of lengths increasing from a reference side of the continuous form or, in alternative, to the end of executing perforations of lengths increasing from a side of the continuous form, opposite to the reference side.

23. An equipment for transversal perforations of varying lengths on a continuous form in movement, comprising a blade support with at least a perforating blade, a blade contrast comprising a hollow cylinder and having at least one projecting profile of contrast for the perforating blade, a blade servomechanism, and a contrast servomechanism, wherein the blade support and the blade contrast have possibility of rotation transversally to a direction of movement (A) of the form, and wherein the blade servomechanism and the contrast servomechanism rotate the support blade and the blade contrast to carry the perforating blade in interference with a projecting profile, in synchronism with the form, wherein:

the perforating blade has a length suitable for the perforations of maximum length (L) of the form; and wherein the projecting profile has sectors on respective angular positions ($\phi$) of the blade contrast and having axial extensions dependent on the respective angular positions ($\phi$);

wherein the contrast servomechanism is settable for selecting an angular phase of the blade contrast, such to positioning, for the contrast with the perforating blade, a sector of the projecting profile having axial extension equal to the requested length of the perforation; and wherein the blade contrast includes two adjacent sleeve sections, arranged along a common axis, and each of said sleeve sections has two projecting profiles of contrast for a perforating blade or more perforating blades and wherein each sleeve section is rotated with individually selectable angular phases by a respective contrast servomechanism;

the projecting profiles of each sleeve section include each one an increasing profile and a decreasing profile;

the increasing profile and the decreasing profile of a first sleeve section have axial extensions of increasing lengths and decreasing lengths, respectively, from a reference end of the blade contrast to a reference end of the first sleeve section adjacent to the second sleeve section;

the increasing profile and the decreasing profile of a second sleeve section have axial extensions of increasing lengths and decreasing lengths, respectively, from an end adjacent to the first sleeve section to an end of the blade contrast opposite to the reference end; and the respective angular phases of the first sleeve section and the second sleeve section being modifiable so as to define a resultant sector of contrast for the perforating blade, which is constituted by sectors of the projecting profiles of the two sleeve sections having variable starting and ending for executing perforations of the continuous form having freely selectionable lengths and transversal positions.

* * * * *